United States Patent [19]

Tolmie, Jr.

[11] Patent Number: 4,988,905
[45] Date of Patent: Jan. 29, 1991

[54] INTEGRATED DRIVER-ENCODER ASSEMBLY FOR BRUSHLESS MOTOR

[75] Inventor: Robert J. Tolmie, Jr., Brookfield, Conn.

[73] Assignee: Pitney Bowes Inc., Stamford, Conn.

[21] Appl. No.: 551,681

[22] Filed: Jul. 12, 1990

Related U.S. Application Data

[63] Continuation of Ser. No. 375,565, Jul. 5, 1989, abandoned.

[51] Int. Cl.$^5$ .................. H02K 11/00; H02K 5/00; H02K 5/22
[52] U.S. Cl. .................................. 310/68 B; 310/71; 310/89; 310/DIG. 6
[58] Field of Search ............ 310/68 R, 68 B, 71, 310/89, DIG. 3, DIG. 6; 318/138, 254 R, 254 A; 361/383, 393, 394, 396

[56] References Cited

U.S. PATENT DOCUMENTS

| | | | |
|---|---|---|---|
| 3,483,458 | 12/1969 | Kirk | 318/254 |
| 3,809,935 | 5/1974 | Kristen et al. | 310/68 R |
| 3,942,084 | 3/1976 | Louth | 318/138 |
| 4,074,173 | 2/1978 | Janssen | 318/138 |
| 4,228,384 | 10/1980 | Arnold, Jr. et al. | 318/138 |
| 4,405,885 | 9/1983 | Okamoto | 318/138 |
| 4,629,948 | 12/1986 | Tassinario | 318/254 |
| 4,642,496 | 2/1987 | Kerviel et al. | 310/68 B |
| 4,668,898 | 5/1987 | Harms et al. | 310/68 R |
| 4,712,030 | 12/1987 | Lakin et al. | 310/89 |
| 4,758,768 | 7/1988 | Hendricks et al. | 318/254 |
| 4,773,829 | 9/1988 | Vettori | 310/68 R |
| 4,779,031 | 10/1988 | Arends et al. | 310/68 R |

FOREIGN PATENT DOCUMENTS

| | | | |
|---|---|---|---|
| 2258361 | 5/1973 | Fed. Rep. of Germany | 310/68 B |
| 2726948 | 1/1979 | Fed. Rep. of Germany | 310/68 B |
| 0055041 | 3/1989 | Japan | 310/68 B |

*Primary Examiner*—Steven L. Stephan
*Assistant Examiner*—C. La Balle
*Attorney, Agent, or Firm*—Charles G. Parks, Jr.; David E. Pitchenik; Melvin J. Scolnick

[57] ABSTRACT

An improved brushless motor apparatus has a first housing section which defines a generally cylindrical chamber enclosed by first and second end walls. A first rotor section is rotatively mounted in the chamber. The chamber has a plurality of formed stators winding in line communication with a first coupler. The rotor having a second rotor section extending beyond said second end wall to which a actuation disk is detachably mounted. The actuator disk has magnetized on one face a commutator ring and a encoder ring. A driver board is detachably mounted to the second end wall and has fixably mounted thereto a second coupler mating with the first coupler. A plurality of commutator sensors are aligned opposite to the commutator ring and a plurality of encoder sensors are aligned opposite the encoder ring. The driver board has mounted to its second face a third coupler and a driver circuit in electronic communication with the commutator and encoder sensors, and the second coupler and the third coupler. A third end wall is detachably mounted to said end wall locating the driver board and actuation disk therebetween.

4 Claims, 2 Drawing Sheets

4,988,905

INTEGRATED DRIVER-ENCODER ASSEMBLY FOR BRUSHLESS MOTOR

This application is a continuation of application Ser. No. 375,565, filed 7/5/89 now abandoned.

BACKGROUND OF THE INVENTION

This invention relates to brushless motors and, more particularly,, motor driver assemblies and encoder assemblies therefor.

Conventionally, a motor driver system, particularly a brushless motor drive system which is subject to microprocessor control, includes a motor drive circuit remotely located from the motor. The motor drive circuit receives motor drive instruction from a microprocessor. Pursuant to received microprocessor instruction, the drive circuit properly activates the motor windings, i.e., commutates the motor, and gates driving current to the motor. In those motor application requiring a high degree of motor control, it is known to attach a separate encoder assemble to the output shaft of the motor.

SUMMARY OF THE PRESENT INVENTION

It is objective of the present invention to present a brushless motor having an integrated drive board and encoder means.

The brushless motor is comprised of a housing having a plurality of housing stages. The housing first stage has mounted therein a rotor and formed stators in a conventional manner. The motor windings are journeyed around the stators in a conventional manner having the windings leads communicate with pin connectors in a conventional manner.

One end of the rotor extends beyond a support wall of the first stage housing. Mounted in a fixed axial location around the extended portion of the rotor is an encoder disk. The encoder disk includes a commutator and encoder actuation ring. Located radially opposite the encoder disk is a driver circuit board having a set of edge mounted connectors to mate with the pin connectors. The driver board face opposite the encoder disk surface has mounted thereon a plurality of commutator sensors and encoder sensors radially opposite the commutator ring and encoder ring, respectively. The opposite face of the driver board has surface mounted thereon a driver circuit in communication with the edge mounted connectors. Also mounted to the opposite driver board face is a second connector for receiving a flex buss which communicates the drive circuit with the microcontroller in a conventional manner. Also edge mounted to the driver board are six (6) driver transistor elements. A end wall is fixably mounted to the first stage housing to form the second stage enclosing the driver board and activation disk.

DETAILED DESCRIPTION OF THE PREFERRED EMBODIMENT

Figure 1:
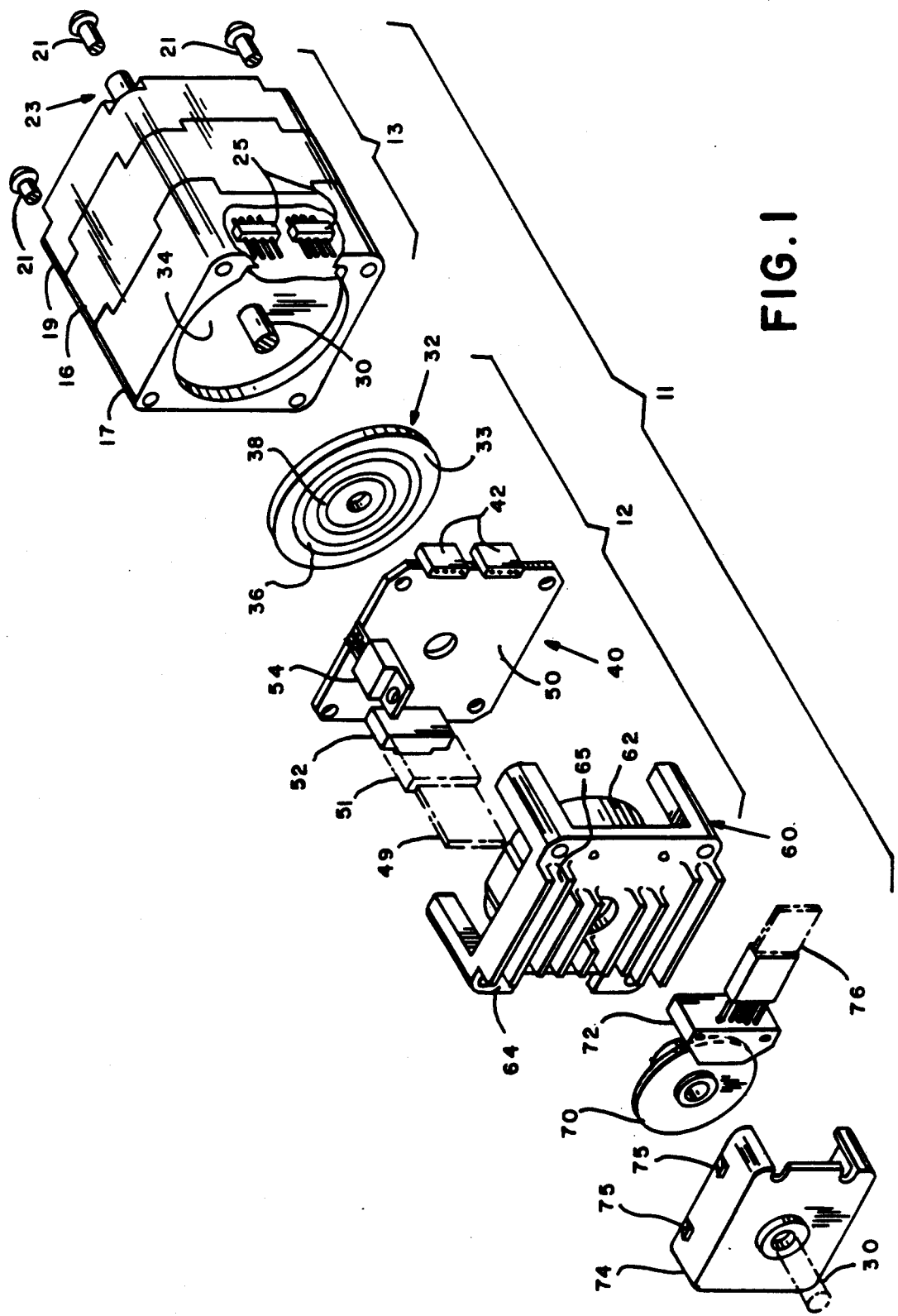
FIG. 1. is an exploited view of a brushless motor having integrated driver and encoder means assemblies in accordance with the present invention.
Figure 2:
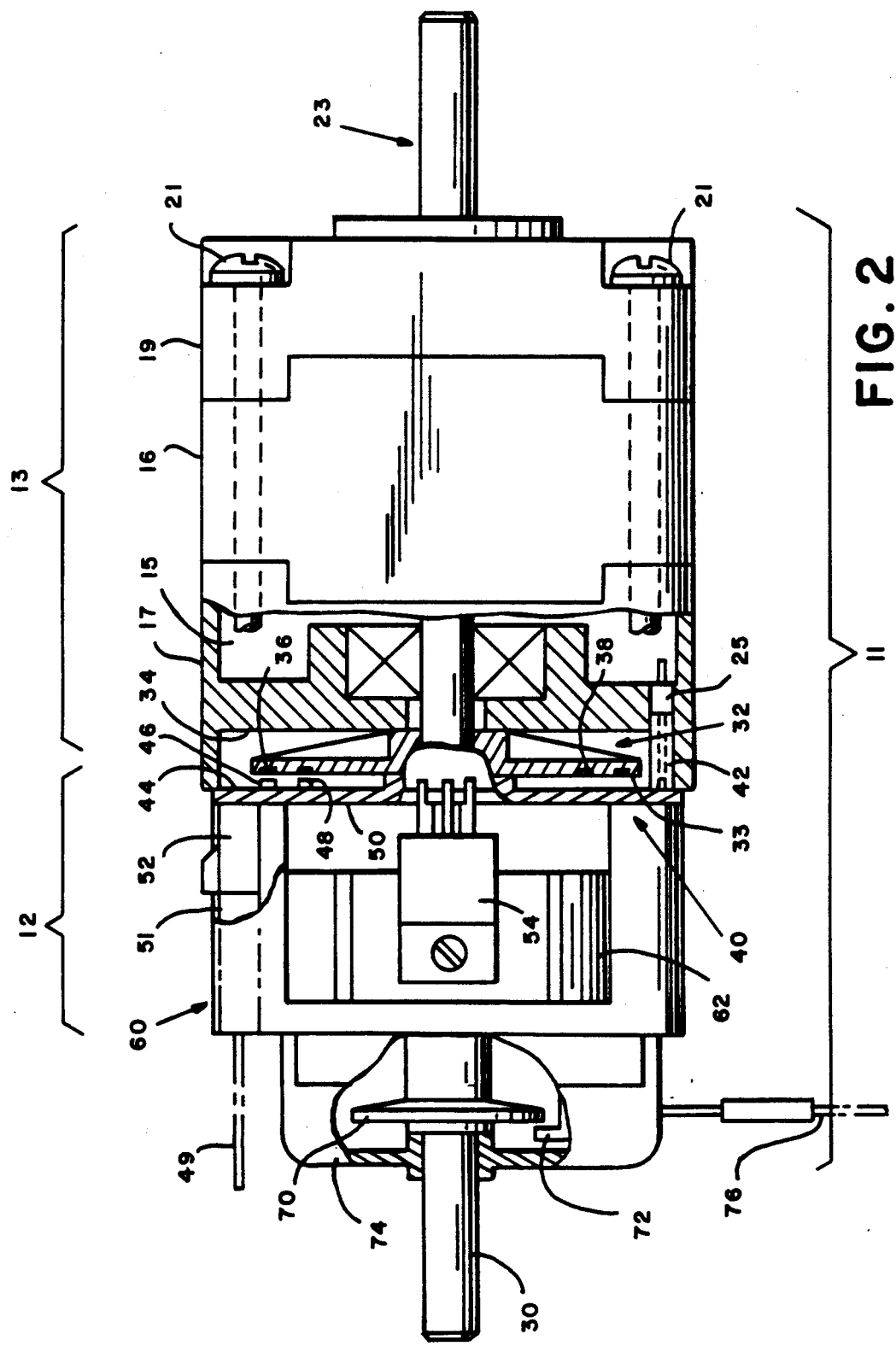
FIG. 2 is a partially sectioned view of the brushless motor, and driver and encoder assemblies.

Referring to the FIGS. 1 and 2, a brushless motor, generally indicated as 11, includes a housing 16 which defines a cylindrical chamber 15 open at its ends. The housing chamber 15 is enclosed at its respective ends by end walls 17 and 19, respectively, in a conventional manner such as by screws 21. Within the chamber 15, a portion of a rotor 23 rotatively supported by end walls 17 and 19 in a conventional manner. The housing 16 has formed within the chamber 15 a stator, around which are wound motor windings (not shown) in a conventional manner. The ends of the motor windings are respectively placed in direct communication with pin connectors 25 to the driver and encoder second motor stage 12.

A second rotor section 30 of the rotor 23 extends beyond end wall 17. Mounted in fixed radial location around a portion of the rotor section 30 by conventional means is an encoder disk 32. The end wall 17 includes a recess 34 for receiving the encoder disk 32. The encoder disk 32 has magnetized on one face 33 of the encoder disk 32 a commutator and encoder actuation ring 38 and 36, respectively. Detachably mounted to the end wall 17, such as by threaded engagement with the screws 21, is a driver circuit board 40 having a set connectors 42 which matingly receive respective pin connectors 25.

Surface mounted to one face 44 of the driver board 40 opposite the encoder 32 is a plurality of commutator sensors 48 and encoders sensor 46. The commutator sensor 48 are aligned opposite to the commutator ring 38 and the encoder sensors 46 are aligned opposite to the encoder ring 36. The functional relationship between the commutator 38 with the commutator sensors 48 and the encoder ring 36 and encoder sensors 46 is set forth in U.S. patent application Ser. No. 348,534 here incorporated by reference. Surface mounted to the opposite face 50 of the driver board 40 is conventional driver circuit (not shown). A connector 52 is also mounted to the driver board face 50 in line communication with the driver circuit in a conventional manner. The connector 42 is also in line communication with the driver circuit for actuation of the windings in a conventional manner. A flex line 49 has an end connector 51 which is matingly received in connector 52 such that a microprocessor may communicate with the driving board 40 through flex line 49 in a conventional manner. Edge mounted in a conventional manner to the driver board 40 are six (6) conventional power transistors 54.

An end wall and heat sink 60 having cylindrical section 62 is fixably mounted to the end wall 17 by any conventional means, such as, by threaded engagement with screws 21, such that the cylindrical section 62 encloses a portion of face 50 of the driver board 40. The cylindrical section 62 is intended to protectively enclose the active elements of the driver circuit except the power transistors. The power transistors 54 are detachably fastened to an outer portion of the cylindrical section 62 by any conventional means, such as by a screw. The end wall 60 as mounted to the first stage end wall 17 forms a second stage. The end wall 60 may have formed on its other face 64 cooling fins 65.

It is now apparent to those skilled in the art that the motor 11 as afore-described offers the further benefit of easy removal and replacement of motor electronics.

The motor 11 may further include a higher resolution encoder disk 70 mounted in fixed radial location on a further portion of shaft portion 30 just beyond end wall 64. A conventional optical encoder sensing member 72 is mounted to end wall 60 by any conventional means. A end cover 74 is then detachably mounted, such as by snaps 75 to the end wall cooling fins 65 to enclose the encoder disk 70 and sensing member 72. The sensor member 72 is in communication with the microprocessor by means of flex line 76.

What is claimed is:

1. An improved brushless motor having a first housing section defining a generally cylindrical chamber enclosed by a first and second end walls and having a first rotor section rotatively mounted in said chamber, said chamber having a plurality of formed stator windings wound around respective stators, said windings having leads received by a first coupler, wherein the improvement comprises:

said rotor having a second rotor section extending beyond said second end wall;

an actuation disk mounted radially around a portion of said second rotor section and having a commutator ring and a encoder ring magnetized into one face of said actuation disk, said actuation disk be detachably mounted axially to said second rotor section;

a driver board detachably mounted to said second end wall and having fixably mounted a second coupler matingly coupled to said first coupler and having mounted to a first face of said driver board a plurality of commutator sensors aligned axially opposite to said commutator ring and a plurality of encoder sensor aligned axially opposite to said encoder ring;

said driver board having mounted to its second face a third coupler and a drive circuit in electronic communication with said commutator sensors, said encoder sensors, said second coupler and said third coupler; and, a third end wall detachably mounted to said second end wall locating said drive board and actuation disk therebetween.

2. An improved brushless motor apparatus as claimed in claim 1 further comprising said second end wall having a recess formed therein for receiving said actuation disk.

3. An improved brushless motor apparatus as claimed in claim 1 further comprising a encoder actuation disk fixably mounted radially and detachably mounted axially to said second rotor section; a encoder sensor assembly detachably mounted to said third end wall cooperatively positioned to said encoder disk; and, a end cover detachably mounted to said third end wall locating said encoder disk and sensor assembly therebetween.

4. An improved brushless motor apparatus having a first housing section defining a generally cylindrical chamber enclosed by first and second end walls and having a first rotor section rotatively mounted in said chamber, said chamber having a plurality of formed stator winding wound around respective stators said windings having leads received by a first coupler, wherein the improvement comprises:

said rotor having a second rotor section extending beyond said second end wall;

a actuation disk mounted radially around a portion of said second rotor section and having a commutator ring and a encoder ring magnetized into one face of said actuation disk, said actuation disk be detachably mounted axially to said second rotor section;

a driver board detachably mounted to said second end wall and having fixably mounted a second coupler matingly coupled to said first coupler and having mounted to a first face of said driver board a plurality of commutator sensors aligned axially opposite to said commutator ring and a plurality of encoder sensor aligned axially opposite to said encoder ring;

said driver board having mounted to its second face a third coupler and a drive circuit in electronic communication with said commutator sensors, said encoder sensors, said second coupler and said third coupler;

a third end wall detachably mounted to said second end wall locating said driver board and actuation disk therebetween and having formed to one face a chamber enclosing said driver circuit of said driver board; and, a heat sink connected to said driver circuit and fixably mounted to said driver board and detachably mounted to said chamber of said third end wall.

* * * * *